US010210854B2

(12) United States Patent
Sakata

(10) Patent No.: US 10,210,854 B2
(45) Date of Patent: Feb. 19, 2019

(54) WAVEFORM DATA STRUCTURE, WAVEFORM DATA STORAGE DEVICE, WAVEFORM DATA STORING METHOD, WAVEFORM DATA EXTRACTING DEVICE, WAVEFORM DATA EXTRACTING METHOD AND ELECTRONIC MUSICAL INSTRUMENT

(71) Applicant: CASIO COMPUTER CO., LTD., Shibuya-ku, Tokyo (JP)

(72) Inventor: Goro Sakata, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/265,820

(22) Filed: Sep. 14, 2016

(65) Prior Publication Data
US 2017/0076707 A1 Mar. 16, 2017

(30) Foreign Application Priority Data

Sep. 15, 2015 (JP) .................................. 2015-182212
Aug. 2, 2016 (JP) .................................. 2016-152124

(51) Int. Cl.
*G10H 7/04* (2006.01)
*G10H 7/00* (2006.01)
(Continued)

(52) U.S. Cl.
CPC ....... *G10H 7/008* (2013.01); *G06F 17/30778* (2013.01); *G10H 1/0041* (2013.01);
(Continued)

(58) Field of Classification Search
CPC ........ G10H 7/008; G10H 1/0041; G10H 7/02; G10H 7/04; G10H 2240/071;
(Continued)

(56) References Cited

U.S. PATENT DOCUMENTS

| 5,347,478 A | 9/1994 | Suzuki et al. |
| 5,727,085 A | 3/1998 | Toyama et al. |

(Continued)

FOREIGN PATENT DOCUMENTS

| EP | 1304680 A2 | 4/2003 |
| EP | 1688909 B1 | 6/2014 |

(Continued)

OTHER PUBLICATIONS

Extended European Search Report (EESR) dated May 22, 2017, issued in counterpart European Application No. 16189007.4.
"Russian Office Action dated Jan. 23, 2018 issued in counterpart Russian Application No. 2016136820".

*Primary Examiner* — Jeffrey Donels
(74) *Attorney, Agent, or Firm* — Holtz, Holtz & Volek PC

(57) ABSTRACT

A waveform data structure includes a plurality of types of frames having different data sizes. Each of the plurality of types of frames includes an auxiliary information area and a data area. The auxiliary information area includes an area for storing common effective-bit length data for a section of waveform samples, and an area for storing an identifier for identifying one of the plurality of types of frames. The data area is an area for storing extracted waveform samples which are extracted from the waveform samples based on the common effective-bit length. The number of the extracted waveform samples is determined based on the common effective-bit length.

12 Claims, 10 Drawing Sheets

(51) Int. Cl.
  *G06F 17/30* (2006.01)
  *G11B 20/12* (2006.01)
  *G10H 1/00* (2006.01)
  *G10H 7/02* (2006.01)
  *G10L 19/16* (2013.01)

(52) U.S. Cl.
  CPC .................. G10H 7/02 (2013.01); G10H 7/04 (2013.01); G11B 20/1251 (2013.01); *G10H 2240/071* (2013.01); *G10H 2240/131* (2013.01); *G10H 2240/161* (2013.01); *G10H 2250/595* (2013.01); *G10H 2250/601* (2013.01); *G10L 19/167* (2013.01)

(58) Field of Classification Search
  CPC ....... G10H 2240/131; G10H 2240/161; G10H 2250/595; G10H 2250/601; G06F 17/30778; G11B 20/1251; G10L 19/167
  USPC .......................................................... 84/605
  See application file for complete search history.

(56) References Cited

U.S. PATENT DOCUMENTS

| | | |
|---|---|---|
| 6,721,711 B1 | 4/2004 | Hoshiai |
| 7,259,315 B2 | 8/2007 | Tamura et al. |
| 7,378,586 B2 | 5/2008 | Okazaki |
| 2004/0069118 A1 | 4/2004 | Okazaki et al. |
| 2005/0188820 A1 | 9/2005 | Park et al. |
| 2006/0081118 A1 | 4/2006 | Okazaki et al. |
| 2007/0240556 A1 | 10/2007 | Okazaki et al. |
| 2008/0078280 A1 | 4/2008 | Okazaki et al. |
| 2008/0154589 A1 | 6/2008 | Tsuchinaga et al. |
| 2009/0025537 A1 | 1/2009 | Tamamura et al. |

FOREIGN PATENT DOCUMENTS

| | | |
|---|---|---|
| JP | 06309895 A | 11/1994 |
| JP | 08211876 A | 8/1996 |
| JP | 2004294490 A | 10/2004 |
| JP | 3826870 B2 | 9/2006 |
| JP | 3945435 B2 | 7/2007 |
| RU | 68691 U1 | 11/2007 |
| RU | 2314502 C2 | 1/2008 |

FIG. 3

512sampleno[ ]

| COMMON EFFECTIVE-BIT LENGTH | NUMBER OF SAMPLES | BLOCK TIME (ms) | BIT RATE (Mbps) |
|---|---|---|---|
| 24 | 169 | 3.833 | 1.0584 |
| 23 | 176 | 3.991 | 1.0143 |
| 22 | 184 | 4.173 | 0.9702 |
| 21 | 193 | 4.377 | 0.9261 |
| 20 | 203 | 4.604 | 0.882 |
| 19 | 213 | 4.83 | 0.8379 |
| 18 | 225 | 5.103 | 0.7938 |
| 17 | 239 | 5.42 | 0.7497 |
| 16 | 254 | 5.76 | 0.7056 |
| 15 | 270 | 6.123 | 0.6615 |
| 14 | 290 | 6.576 | 0.6174 |
| 13 | 312 | 7.075 | 0.5733 |
| 12 | 338 | 7.665 | 0.5292 |
| 11 | 369 | 8.368 | 0.4851 |
| 10 | 406 | 9.207 | 0.441 |
| 9 | 451 | 10.227 | 0.3969 |
| 8 | 508 | 11.52 | 0.3528 |
| 7 | 580 | 13.152 | 0.3087 |
| 6 | 677 | 15.352 | 0.2646 |
| 5 | 812 | 18.413 | 0.2205 |
| 4 | 1016 | 23.039 | 0.1764 |
| 3 | 1354 | 30.703 | 0.1323 |
| 2 | 2032 | 46.078 | 0.0882 |

FIG. 4

256sampleno[ ]

| COMMON EFFECTIVE-BIT LENGTH | NUMBER OF SAMPLES | BLOCK TIME (ms) | BIT RATE (Mbps) |
|---|---|---|---|
| 24 | 84 | 1.905 | 1.0584 |
| 23 | 87 | 1.973 | 1.0143 |
| 22 | 91 | 2.064 | 0.9702 |
| 21 | 96 | 2.177 | 0.9261 |
| 20 | 100 | 2.268 | 0.882 |
| 19 | 106 | 2.404 | 0.8379 |
| 18 | 112 | 2.54 | 0.7938 |
| 17 | 118 | 2.676 | 0.7497 |
| 16 | 126 | 2.858 | 0.7056 |
| 15 | 134 | 3.039 | 0.6615 |
| 14 | 144 | 3.266 | 0.6174 |
| 13 | 155 | 3.515 | 0.5733 |
| 12 | 168 | 3.81 | 0.5292 |
| 11 | 183 | 4.15 | 0.4851 |
| 10 | 201 | 4.558 | 0.441 |
| 9 | 224 | 5.08 | 0.3969 |
| 8 | 252 | 5.715 | 0.3528 |
| 7 | 288 | 6.531 | 0.3087 |
| 6 | 336 | 7.62 | 0.2646 |
| 5 | 403 | 9.139 | 0.2205 |
| 4 | 504 | 11.429 | 0.1764 |
| 3 | 672 | 15.239 | 0.1323 |
| 2 | 1008 | 22.858 | 0.0882 |

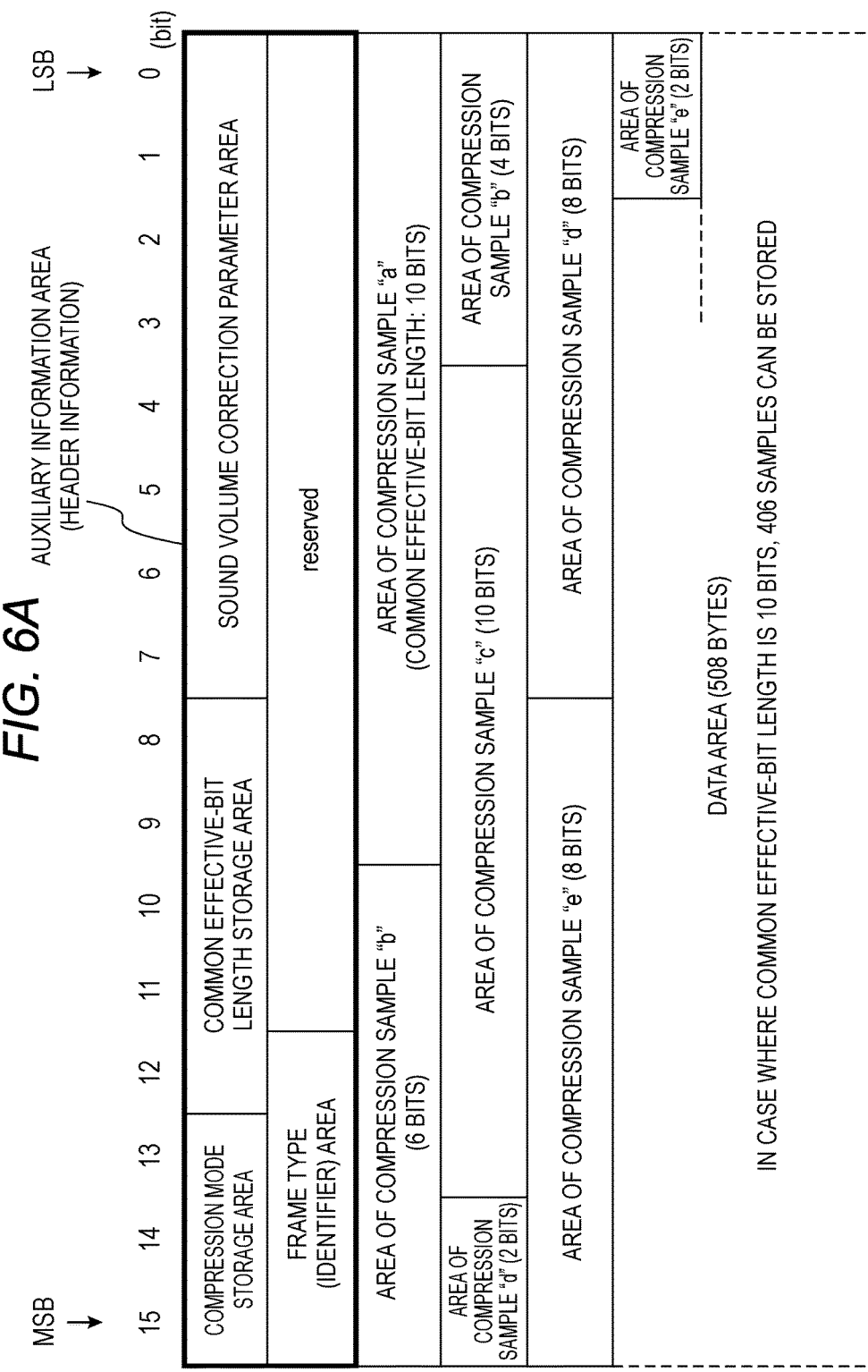

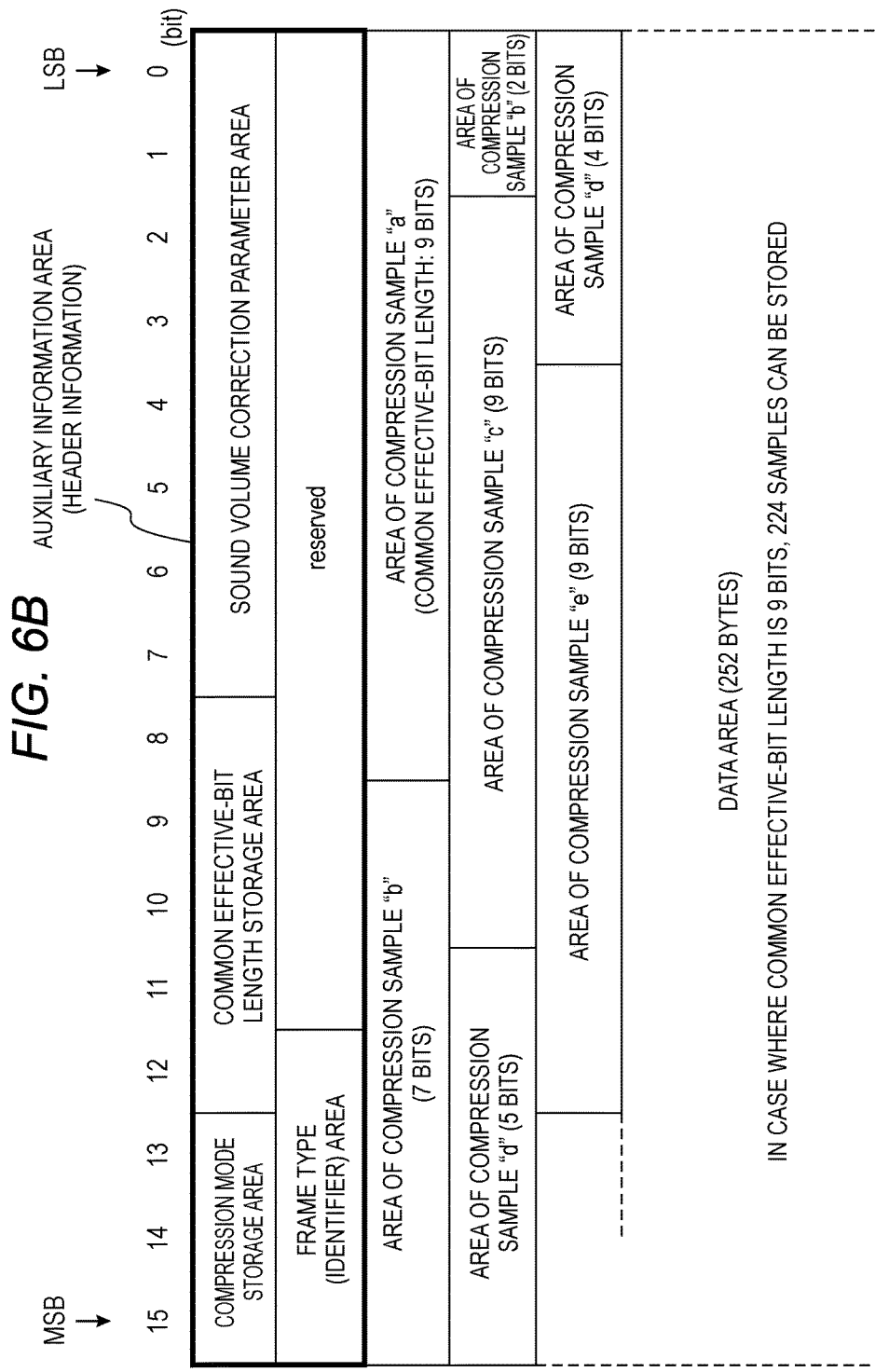

WAVEFORM DATA STRUCTURE, WAVEFORM DATA STORAGE DEVICE, WAVEFORM DATA STORING METHOD, WAVEFORM DATA EXTRACTING DEVICE, WAVEFORM DATA EXTRACTING METHOD AND ELECTRONIC MUSICAL INSTRUMENT

CROSS-REFERENCE TO RELATED APPLICATIONS

This application is based upon and claims the benefit of priority from the prior Japanese Patent Application Nos. 2015-182212, filed on Sep. 15, 2015, and 2016-152124, filed on Aug. 2, 2016 and the entire contents of which are incorporated herein by reference.

BACKGROUND OF THE INVENTION

Field of the Invention

The present invention relates to a waveform data structure, a waveform data storage device, a waveform data storing method, a waveform data extracting device, a waveform data extracting method and an electronic musical instrument for setting different frame sizes depending on tones (waveform types).

Description of Related Art

There are known waveform generating technologies using compressed data structures which can be decompressed by simple configurations. As this type of technology, for example, in JP-B-3826870, there has been disclosed a technology for storing compressed waveform data in frames having a fixed size, and assigning an auxiliary information area and a data area to fixed positions in each frame, and storing auxiliary information and compressed waveform data in those areas, respectively.

According to this technology, even in a case where the numbers of bits of compressed waveform data samples are different, the size of data areas does not vary. Therefore, depending on the numbers of bits of compressed waveform data samples to be stored, the number of compressed waveform data samples which can be stored in one frame varies. Therefore, even in a case where the numbers of bits of compressed waveform data samples are different, since the start positions of frames are arranged at regular memory address intervals, address management becomes easy, and thus it becomes to decompress them with a simple configuration.

SUMMARY OF THE INVENTION

However, the technology disclosed in JP-B-3826870 has the following problems.

(a) If the frame size is fixed, although address management becomes easy (it becomes possible to decompress compressed samples with a simple configuration, in a case where the numbers of bits per sample of adjacent frames do not vary, header information (auxiliary information) is repeated, and memory areas for header information are wasted.

(b) In order to restore data, it is necessary to access and acquire header information in advance, separately from an operation of consecutively reading data. However, if access to header information is frequent, when a memory which is dominated by consecutive access is used, an amount of data which can be transmitted decreases.

(c) If a small frame size is set, in a case where a waveform varies rapidly, it is possible to efficiently convert data in response to variation in the waveform; whereas in a case where a waveform rarely varies, as the number of frames increases, an amount of wasteful redundant header information increases.

(d) If a large frame size is set based on the maximum value of the numbers of bits of various data streams having different lengths, in a case where a waveform varies rapidly, the numbers of code bits of a lot of waveform samples having various bit lengths increase.

The problems (a) to (d) described above can be summarized as follows: there is a problem that it is impossible to set different frame sizes depending on tones (waveform types).

The present invention was made in view of the above-described circumstances, and an object of the present invention is to provide a waveform data structure, a waveform data storage device, a waveform data storage method, a waveform data extracting device, a waveform data extracting method, and an electronic musical instrument capable of setting different frame sizes depending on tones (waveform types).

A waveform data structure includes a plurality of types of frames having different data sizes. Each of the plurality of types of frames includes an auxiliary information area and a data area. The auxiliary information area includes an area for storing common effective-bit length data for a section of waveform samples, and an area for storing an identifier for identifying one of the plurality of types of frames. The data area is an area for storing extracted waveform samples which are extracted from the waveform samples based on the common effective-bit length. The number of the extracted waveform samples is determined based on the common effective-bit length.

A waveform data storage device includes a determining unit, an auxiliary information storage unit and a waveform sample storage unit. The determining unit determines one of at least first and second frames based on variation in effective-bit lengths of individual waveform samples to be stored. The set number of waveform samples to be stored in the first frame is different from the set number of waveform samples to be stored in the second frame. The auxiliary information storage unit stores frame attribute data including a common effective-bit length of the waveform samples and a frame type for identifying one of the first and second frames, in an auxiliary information area of the first or second frame determined by the determining unit. The waveform sample storage unit stores the waveform samples in a data area of the first or second frame determined by the determining unit, based on the set number of waveform samples according to the common effective-bit length of the frame attribute data stored in the auxiliary information area.

In a waveform data storing method of a waveform data storage device, the waveform data storage device is configured to: determine one of at least first and second frames based on variation in effective-bit lengths of individual waveform samples to be stored, the number of waveform samples to be stored in the first frame being different from the number of waveform samples to be stored in the second frame; store frame attribute data including a common effective-bit length of the waveform samples and a frame type for identifying one of the first and second frames, in an auxiliary information area of the determined first or second frame; and store as many waveform samples as the number of samples according to the common effective-bit length of the frame attribute data stored in the auxiliary information area, in a data area of the determined first or second frame.

A waveform data extracting device accesses a memory having the waveform data structure. The waveform data extracting device includes an address data generating unit, an extracting unit and a frame designating unit. The address data generating unit generates address data based on the common effective-bit length read from the auxiliary information area of a designated frame stored in the memory. The extracting unit extracts the waveform samples from the data area of the designated frame, according to the address data generated by the address data generating unit. The frame designating unit designates the next frame to be extracted after the waveform samples are extracted by the extracting unit.

In a waveform data extracting method of a waveform data extracting device, the waveform data extracting device is configured to access a memory having the waveform data structure. The waveform data extracting method includes: generating address data based on bit length data read from the auxiliary information area of a designated frame stored in the memory; extracting the waveform samples from the data area of the designated frame, according to the generated address data; and designating the next frame to be extracted after the waveform samples are extracted.

An electronic musical instrument includes a memory, a waveform data extracting device, a musical-instrument-performance input unit, a processing unit and a sound producing unit. The memory has the waveform data structure. The musical-instrument-performance input unit generates musical-instrument-performance information according to playing operations. The processing unit performs an instructing process of instructing music generation according to the playing operations, and a control process of controlling the waveform data extracting device such that the waveform data extracting device extracts necessary waveform samples from the memory in response to the instructing process. The sound producing unit produces music sound based on waveform data obtained by decompressing the waveform samples taken from the waveform data extracting device.

According to the present invention, it is possible to provide a waveform data structure, a waveform data storage device, a waveform data extracting device, a waveform data extracting method, and an electronic musical instrument capable of setting different frame sizes depending on tones (waveform types).

BRIEF DESCRIPTION OF THE DRAWINGS

FIG. 3 is a view illustrating the content of Table 512sampleno[ ].

FIG. 4 is a view illustrating the content of Table 256sampleno[ ].

FIG. 6A is a view illustrating an example of the configuration of a 512-byte frame, and FIG. 6B is a view illustrating an example of the configuration of a 256-byte frame.

DETAILED DESCRIPTION

Figure 1:
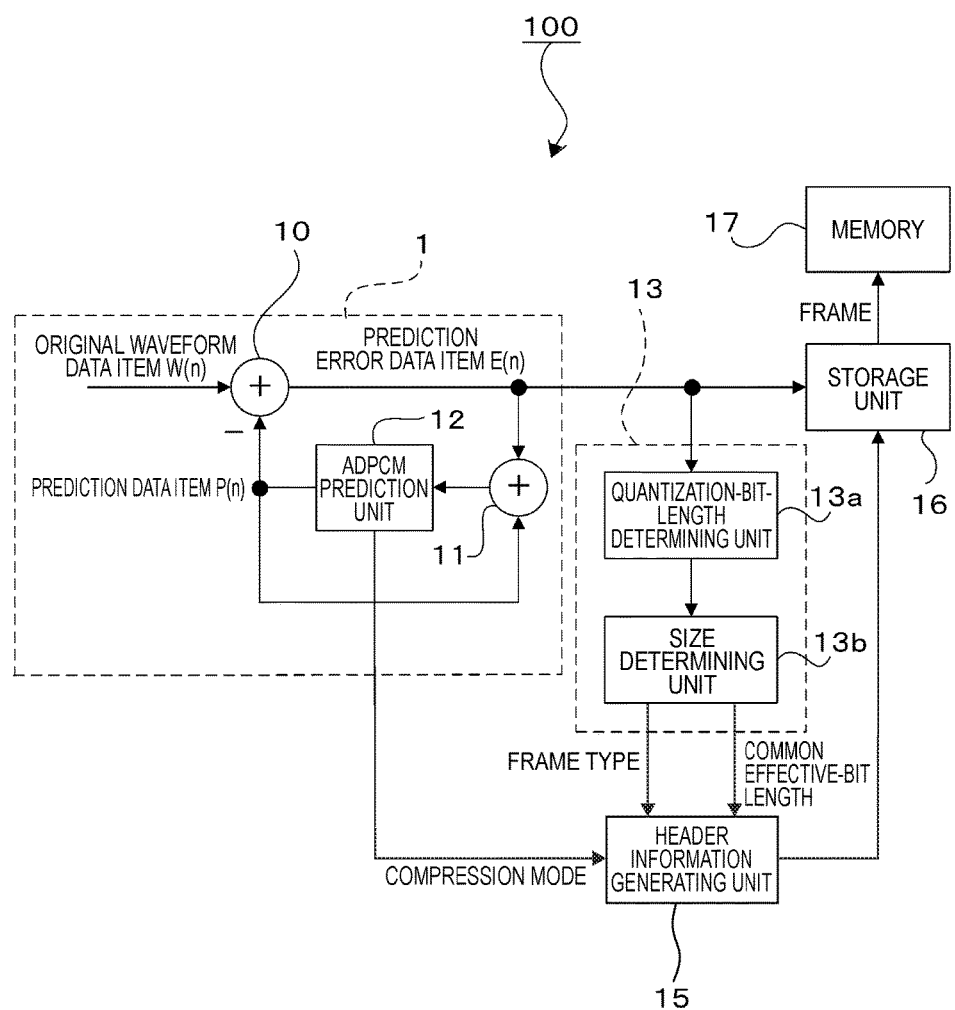
FIG. 1 is a block diagram illustrating the configuration of a waveform data storage device 100 according to an embodiment of the present invention.

Hereinafter, embodiments of the present invention will be described with reference to the accompanying drawings. FIG. 1 is a block diagram illustrating the overall configuration of a waveform data storage device 100 according to an embodiment of the present invention. In the present embodiment, an example using ADPCM type data compression will be described. ADPCM is an abbreviation for Adaptive Differential Pulse Code Modulation. However, the present invention is not limited thereto, and can use any other compression mode such as linear predictive coding (LPC).

In FIG. 1, a waveform data compressing unit 1 is composed of a subtractor 10, an adder 11, and an ADPCM prediction unit 12. The subtractor 10 subtracts a prediction data item P(n) from an original waveform data item W(n), thereby extracting the different as a prediction error data item E(n). The adder 11 adds a prediction data item P(n) to a prediction error data item E(n), and supplies the sum to the ADPCM prediction unit 12. The ADPCM prediction unit 12 generates a prediction data item P(n) and a predictive coefficient for the original waveform data item W(n+1) of the next sample, using an adaptive predictive model.

A determining unit 13 is composed of a quantization-bit-length determining unit 13a and a size determining unit 13b. The quantization-bit-length determining unit 13a determines the effective-bit length of each quantized sample based on the prediction error data item E(n) of a current sample and the prediction error data items E of a predetermined number of previous samples. The size determining unit 13b determines whether to set the size of one frame to 256 bytes (4 bytes for an auxiliary information area for storing header information and 252 bytes for a data area) or to 512 bytes (4 bytes for an auxiliary information area for storing header information and 508 bytes for a data area), based on a common effective-bit length calculated based on the effective-bit lengths determined by the quantization-bit-length determining unit 13a. The details of such determination will be described below.

Now, the configuration and operation of the determining unit 13 will be roughly described with reference to FIGS. 2 to 5. The determining unit 13 is implemented by hardware including arithmetic logic circuits and a work memory (not shown). Hereinafter, in order to simplify the explanation, a description will be described with a flow chart illustrating the function of the determining unit 13 which is implemented by hardware, as processing operations of software. Alternatively, a CPU may perform those processes by software.

Figure 2A:
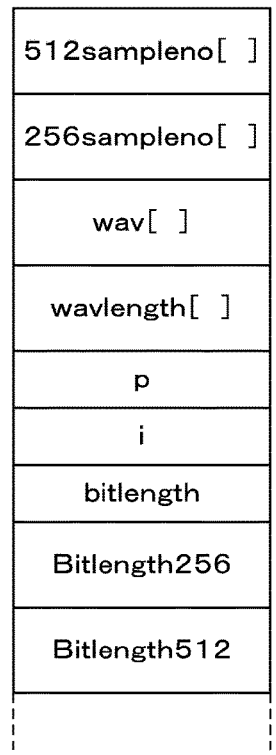
FIG. 2A is a memory map illustrating the configuration of a work memory which is included in a determining unit 13.

First, FIG. 2A is a memory map illustrating the configuration of the work memory included in the determining unit 13. In FIG. 2A, Table 512sampleno[ ] is a data table for reading the number of samples which can be stored in a case where the size of one frame is 512 bytes, based on a common effective-bit length, and the content thereof is shown in FIG. 3.

If a common effective-bit length is read as an address (a parameter), the number of samples which can be stored in a 512-byte frame corresponding to the read common effective-bit length is read from Table 512sampleno[ ] shown in FIG. 3. For example, in a case where a common effective-bit length is "20" bits, from Table 512sampleno[ ], a number "203" is read (determined) as the number of samples which can be stored in a 512-byte frame.

Also, the number of samples which can be stored in a 512-byte frame can be calculated by the following Expression 1.

[Number of Samples]=INT(4064(bits)/Common Effective-Bit Length)　　　(1)

In Expression 1, INT is a floor function which rounds a number down to the nearest integer, and the number "4064 (bits)" is obtained as follows: 8 (bits)×[(Frame Size (512 bytes))−(Header Size (4 bytes for Auxiliary Information Area))]. Also, in Table 512sampleno[ ] shown in FIG. 3, an item "BLOCK TIME" represents a waveform section length corresponding to the number of samples, in milliseconds, and an item "BIT RATE" represents a value obtained by multiplying a common effective-bit length by a sampling frequency (44.1 kHz), in Mbps.

Similarly to Table 512sampleno[ ] described above, Table 256sampleno[ ] is a data table for reading the number of samples which can be stored in a 256-byte frame, based on a common effective-bit length, if the corresponding common effective-bit length is read as an address (a parameter), and the content thereof is shown in FIG. 4. For example, in a case where a common effective-bit length is "20" bits, from Table 256sampleno[ ] shown in FIG. 4, a number "100" is read (determined) as the number of samples which can be stored in a 256-byte frame.

Also, the number of samples which can be stored in a 256-byte frame can be calculated by the following Expression 2.

[Number of Samples]=INT(2016(bits)/Common Effective-Bit Length)　　　(2)

In Expression 2, INT is a floor function which rounds a number down to the nearest integer, and the number "2016" is obtained as follows: 8 (bits)×[(Frame Size (256 bytes))−(Header Size (4 bytes for Auxiliary Information Area))]. Also, in Table 256sampleno[ ] shown in FIG. 4, an item "BLOCK TIME" represents a waveform section length corresponding to the number of samples, in milliseconds, and an item "BIT RATE" represents a value obtained by multiplying a common effective-bit length by a sampling frequency (44.1 kHz), in Mbps.

An array "wav[ ]" is a register for temporarily storing 2032 waveform samples (prediction error data items E), wherein the number "2032" is the maximum number of samples which can be stored in one 512-byte frame in a case where it is assumed that the common effective-bit length of waveform samples (prediction error data items E) is 2 bits. Hereinafter, prediction error data items E will be referred to as waveform samples. In the array "wav[ ]", 2032 waveform samples are stored, for example, in a form shown in FIG. 2B. Each sample is composed of code bits S and actual data bits M, and the bit length of the actual data bits M is referred to as the effective-bit length of the corresponding sample. An array "wavelength[ ]" is a register for temporarily storing the effective-bit lengths of 2032 waveform samples stored in the above-described array "wav[ ]".

A register "p" is an address pointer to be referred to for reading or writing waveform samples from or in the array "wav[ ]". Hereinafter, the content of the register "p" will be referred to as the address pointer "p". A register "i" is a data pointer for designating the effective-bit lengths of each waveform sample stored in the array "wavelength[ ]". Hereinafter, the content of the register "i" will be referred to as the pointer "i". A register "bitlength" is a register for storing a variable which sequentially increases from an initial value "2". Hereinafter, the content of the register "bitlength" will be referred to as the bit length variable "bitlength". In a section where there are waveform samples, the maximum effective-bit length (bitlength) is referred to as the common effective-bit length (Bitlength256 or Bitlength512) of the waveform samples. A register "bitlength256" holds the common effective-bit length of waveform samples to be stored in a 256-byte frame. A register "bitlength512" holds the common effective-bit length of waveform samples to be stored in a 512-byte frame.

Figure 5:
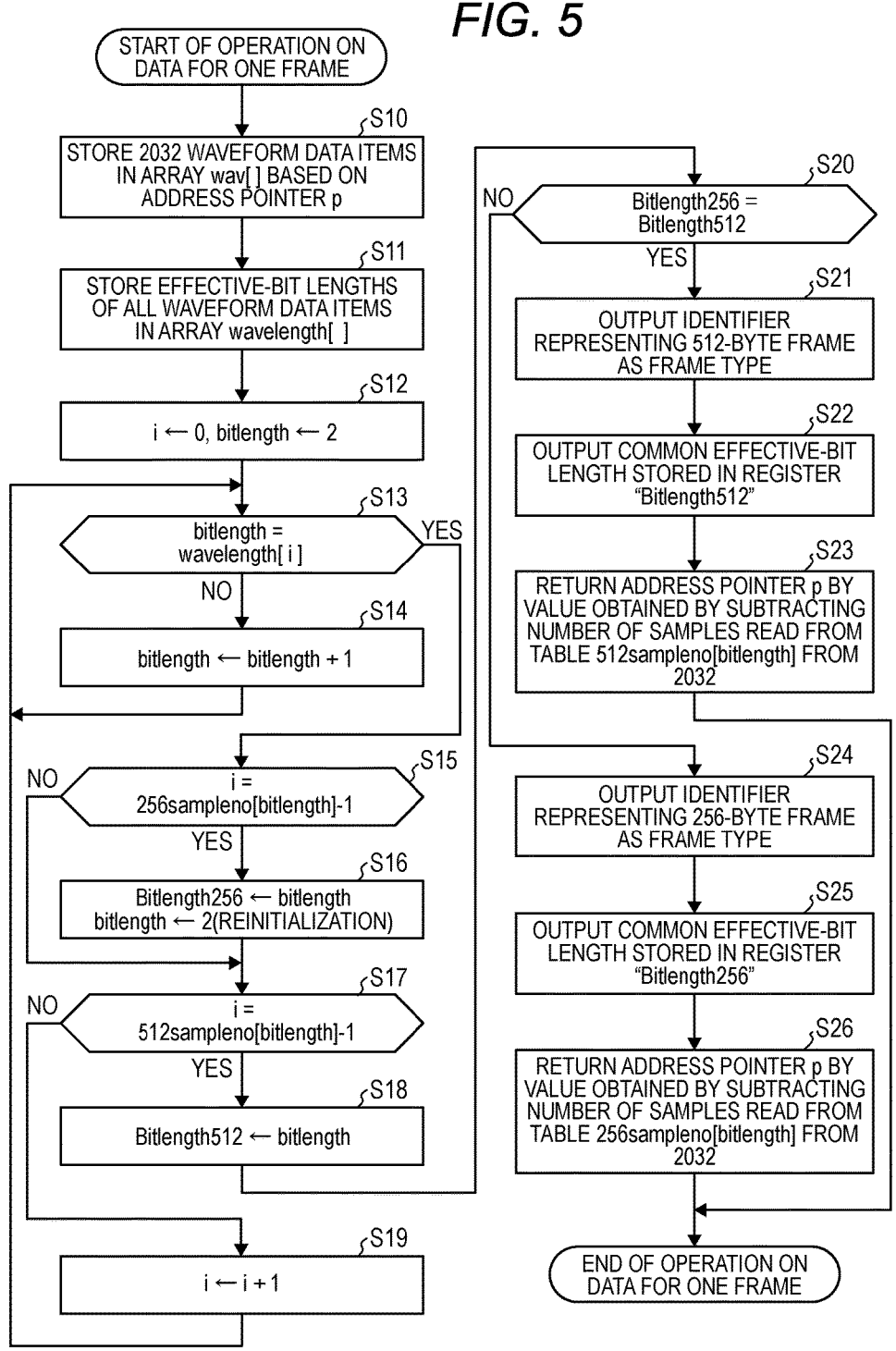
FIG. 5 is a flow chart illustrating the function of the determining unit 13 which is composed of hardware, as processing operations of software.

Now, the operation of the determining unit 13 will be described with reference to FIG. 5. FIG. 5 is a flow chart illustrating the function of the determining unit 13 which is implemented by hardware, as processing operations of software. The determining unit 13 performs operations shown in the flow chart of FIG. 5, for each frame.

Figure 2B:
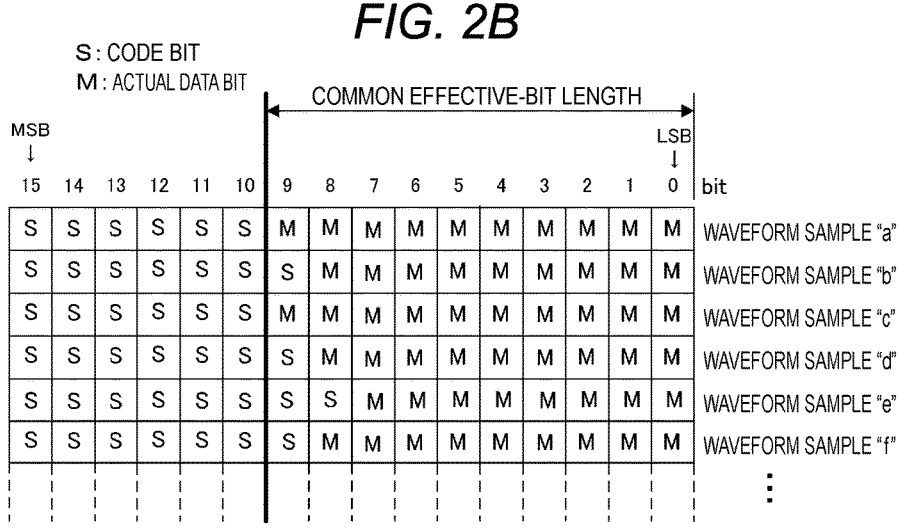
FIG. 2B is a view illustrating examples of waveform samples which are stored in an array "wav[ ]".

First, in STEP S10, the determining unit 13 stores 2032 waveform samples in the array "wav[ ]" according to the address pointer "p", wherein the number "2032" is the maximum number of samples which can be stored in one 512-byte frame. Subsequently, in STEP S11, the determining unit 13 loads the effective-bit lengths of the 2032 waveform samples stored in the array "wav[ ]", into array "wavelength[ ]". Here, each waveform sample (each prediction error data item E) is composed of code bits S and actual data bits M as shown in FIG. 2B, and the effective-bit length thereof means the bit length of the actual data bits M.

Next, in STEP S12, the determining unit 13 resets the pointer "i" to zero, and sets the bit length variable "bitlength" to the initial value "2". Subsequently, in STEP S13, the determining unit 13 determines whether the bit length variable "bitlength" coincides with the effective-bit length of the i-th waveform sample of the array "wavelength[ ]" designated by the pointer "i".

If both do not coincide with each other, the determination result of STEP S13 becomes "NO", and the determining unit 13 proceeds to STEP S14 in which it increases the bit length variable "bitlength", and then returns processing to STEP S13 again. Thereafter, until the bit length variable "bitlength" coincides with the effective-bit length of the i-th waveform sample (the i-th prediction error data item E) of the array "wavelength[ ]" designated by the pointer "i", the determining unit repeats STEPS S13 and S14 while increasing the bit length variable "bitlength".

Meanwhile, if the increased bit length variable "bitlength" coincides with the effective-bit length of the i-th waveform sample of the array "wavelength[ ]" designated by the pointer "i", the increased bit length variable "bitlength" is detected as whereby the effective-bit length of the waveform sample designated by the pointer "i", the determination result of STEP S13 becomes "YES", and the determining unit proceeds to STEP S15.

In STEP S15, the determining unit 13 determines whether the value of the pointer "i" coincides with a value obtained by subtracting "1" from the number of samples, which can be stored in one 256-byte frame, read from Table 256sampleno[bitlength] based on the effective-bit length detected in STEP S13, that is, whether processing on waveform samples corresponding to one 256-byte frame has finished.

If processing on waveform samples corresponding to a 256-byte frame has not finished, the determination result of STEP S15 becomes "NO", and the determining unit proceeds to STEP S17. In STEP S17, the determining unit determines whether the value of the pointer "i" coincides with a value obtained by subtracting "1" from the number of samples, which can be stored in one 512-byte frame, read from Table 512sampleno[bitlength] based on the effective-bit length detected in STEP S13, that is, whether processing on waveform samples corresponding to one 512-byte frame has finished.

If processing on waveform samples corresponding to one 512-byte frame has not finished, the determination result of STEP S17 becomes "NO", and the determining unit proceeds to STEP S19 in which it increases the pointer "i", and then returns processing to STEP S13. Thereafter, in STEPS S13 and S14, the determining unit detects the effective-bit length of the next waveform sample (the next prediction error data item E) designated by the increased pointer "i".

Thereafter, in the course of sequentially detecting the effective-bit lengths of waveform samples which are updated as the value of the pointer "i" increases, if the value of the pointer "i" coincides with a value obtained by subtracting "1" from the number of samples, which can be stored in one 256-byte frame, read from Table 256sampleno [bitlength] based on a detected effective-bit length, whereby processing on waveform samples corresponding to one 256-byte frame finishes, the determination result of STEP S15 becomes "YES", and the determining unit proceeds to STEP S16.

In STEP S16, the determining unit 13 stores the effective-bit length detected at the moment when processing on waveform samples corresponding to one 256-byte frame finished, that is, the value of the bit length variable "bitlength", as the common effective-bit length of the waveform samples, in the register "bitlength256", and resets the vale of the bit length variable "bitlength" to the initial value "2". For example, in the example shown in FIG. 2B, the common effective-bit length of waveform samples "a" to "f" becomes 10 (bits) which is the maximum value of their effective-bit lengths (the lengths of their actual data bits M).

If processing on waveform samples corresponding to one 256-byte frame and corresponding to the first half of a frame finishes as described above, the determining unit 13 proceeds to processing for the second half of the frame. In other words, similarly to the case of the first half of the frame, the determining unit sequentially detects the effective-bit lengths of waveform samples which are updated as the value of the pointer "i" increases (STEPS S13, S14, and S19).

In the course of detecting the effective-bit lengths, if the value of the pointer "i" coincides with a value obtained by subtracting "1" from the number of samples, which can be stored in one 512-byte frame, read from Table 512sampleno [bitlength] based on a detected effective-bit length (the value of the bit length variable "bitlength"), whereby processing on waveform samples corresponding to one 256-byte frame finishes, the determination result of STEP S17 becomes "YES", and the determining unit proceeds to STEP S18.

In STEP S18, the determining unit 13 stores the effective-bit length detected at the moment when processing on waveform samples corresponding to one 512-byte frame finished, that is, the value of the bit length variable "bitlength", as the common effective-bit length of the waveform samples, in the register "bitlength512". Subsequently, in STEP S20, the determining unit 13 determines whether the common effective-bit length stored in the register "bitlength256" coincides with the common effective-bit length stored in the register "bitlength512".

In a case where the common effective-bit length stored in the register "bitlength256" coincides with the common effective-bit length stored in the register "bitlength512", the determination result of STEP S20 becomes "YES", and the determining unit proceeds to STEP S21. Thereafter, in STEPS S21 and S22, the determining unit 13 outputs an identifier representing a 512-byte frame, as the frame size for the waveform samples, and outputs the common effective-bit length stored in the register "bitlength512".

Subsequently, in STEP S23, the determining unit 13 returns the address pointer "p" by a value obtained by subtracting the number of samples, which can be stored in one 512-byte frame, read from Table 512sampleno [bitlength] based on the detected effective-bit length, from 2030 which is the number of samples having been read, and finishes processing corresponding to one frame.

Meanwhile, in a case where the common effective-bit length stored in the register "bitlength256" does not coincide with the common effective-bit length stored in the register "bitlength512", the determination result of STEP S20 becomes "NO", and the determining unit proceeds to STEP S24. Thereafter, in STEPS S24 and S25, the determining unit 13 outputs an identifier representing a 256-byte frame, as the frame size for the waveform samples, and outputs the common effective-bit length stored in the register "bitlength256".

Subsequently, in STEP S26, the determining unit 13 returns the address pointer "p" by a value obtained by subtracting the number of samples, which can be stored in one 256-byte frame, read from Table 256sampleno[bitlength] based on the detected effective-bit length, from 2030 which is the number of samples having been read, and finishes processing corresponding to one frame.

As described above, while the determining unit 13 sequentially reads the effective-bit lengths of individual waveform samples (prediction error data items E), it detects the maximum effective-bit length of effective-bit lengths having been read, as the common effective-bit length of corresponding waveform samples. If the number of samples having been read reaches a value obtained by subtracting "1" from the number of samples which can be stored in one 256-byte frame based on the common effective-bit length— the determining unit forms the first half of a frame. Even with respect to the second half of the frame, while the determining unit 13 sequentially reads the effective-bit lengths of individual waveform samples (prediction error data items E), it detects the maximum effective-bit length of effective-bit lengths having been read, as the common effective-bit length of corresponding waveform samples. If the number of samples having been read reaches a value obtained by subtracting "1" from the number of samples which can be stored in one 512-byte frame based on the common effective-bit length, the determining unit forms the second half of the frame.

Then, in a case where the common effective-bit length of the first half of the frame coincides with the common effective-bit length of the second half of the frame, the determining unit outputs an identifier representing a 512-byte frame, as the frame type for the waveform samples, and outputs the common effective-bit length of the second half of the frame. Meanwhile, in a case where the common effective-bit length of the first half of the frame does not coincide with the common effective-bit length of the second half of the frame, the determining unit outputs an identifier representing a 256-byte frame, as the frame type for the waveform samples, and outputs the common effective-bit length of the first half of the frame.

Also, in the present embodiment, in order to simplify the explanation, frames are formed in two frame sizes, that is, a 512-byte frame size and a 256-byte frame size. However, the present invention is not limited thereto, and frames can be formed in three or more arbitrary frame sizes, for example, by adding a 128-bit frame size. Also, in the present embodiment, the maximum number of samples which can be stored in one 512-byte frame in a case where it is assumed that the common effective-bit length of waveform samples (prediction error data items E) is 2 bits is 2032, and 2032 samples are read. However, the present invention is not limited thereto, and the number of samples which are read may be determined based on an arbitrary frame size.

Now, referring to FIG. 1 again, the configuration of the waveform data storage device 100 will be described. In FIG. 1, a header information generating unit 15 generates a header information item for each frame, based on a compression mode identifier data item "COMPRESSION MODE" generated in the waveform data compressing unit 1, and data items "FRAME TYPE (IDENTIFIER)" and "COMMON EFFECTIVE-BIT LENGTH" output from the determining unit 13.

For example, like in an example shown in FIG. 6A, a header information item is stored in an auxiliary information area having a data capacity of 4 bytes, and is composed of, for example, an area for storing a data item "COMPRESSION MODE", an area for storing a data item "COMMON EFFECTIVE-BIT LENGTH" for frame generation, an area for storing a data item "FRAME TYPE (IDENTIFIER)" representing the size of the data area of one frame, and a reserved area for extensibility. Such a header information item is supplied from the header information generating unit 15 to a storage unit 16.

During compression of samples of a waveform, it is possible to change the ratio of compression by changing a sound volume parameter. For example, with respect to an attack section of the first half of the waveform samples, sound volume data having the same sound volume as that of its original sound is stored, and with respect to the second half of the waveform samples, sound volume data having a sound volume lower than that of its original sound is stored. In this way, it is possible to store the attack section of the first half of the waveform samples with high quality based on a low compression ratio, and it is possible to store the second half of the waveform samples with low quality based on a high compression ratio. A "sound volume correction parameter" is a parameter which is used to restore the sound volume of waveform data stored in the memory to the sound volume of the original sound when the waveform data extracting device 150 extracts compressed waveform data. The waveform data storage device 100 can change sound volume data from the original sound of waveform samples, and stores the changed sound volume data in the memory, and the waveform data extracting device 150 can extract compressed waveform data from the memory, and restore the sound volume of the waveform data to the sound volume of the original sound, using the sound volume correction parameter.

Also, in the present embodiment, an auxiliary information area is disposed at the header part of a frame. However, the present invention is not limited thereto, and an auxiliary information area may be disposed in any other part of a frame, such as a footer part. Also, in a case where auxiliary information areas have a fixed size like in the present embodiment, the sizes of frames are equivalent to the sizes of the data areas of the frames.

In the storage unit 16, a header information item is stored in the auxiliary information area (see FIG. 6) of a frame including a data area having a size designated by the data item "FRAME TYPE (IDENTIFIER)" included in the header information item, and compressed samples obtained by extracting waveform samples (prediction error data items E) based on the data item "COMMON EFFECTIVE-BIT LENGTH" included in the header information item are sequentially stored in the data area next to the auxiliary information area. The number of compressed samples which can be stored in the data area is determined based on the data items "FRAME TYPE (IDENTIFIER)" and the "COMMON EFFECTIVE-BIT LENGTH", and if the number of compressed samples stored in the data area reaches the number of compressed samples which can be stored, the determining unit 13 repeats an operation of determining a frame type (an identifier) and a common effective-bit length based on subsequent waveform samples which are supplied, thereby starting to generate a new frame.

Figure 7:
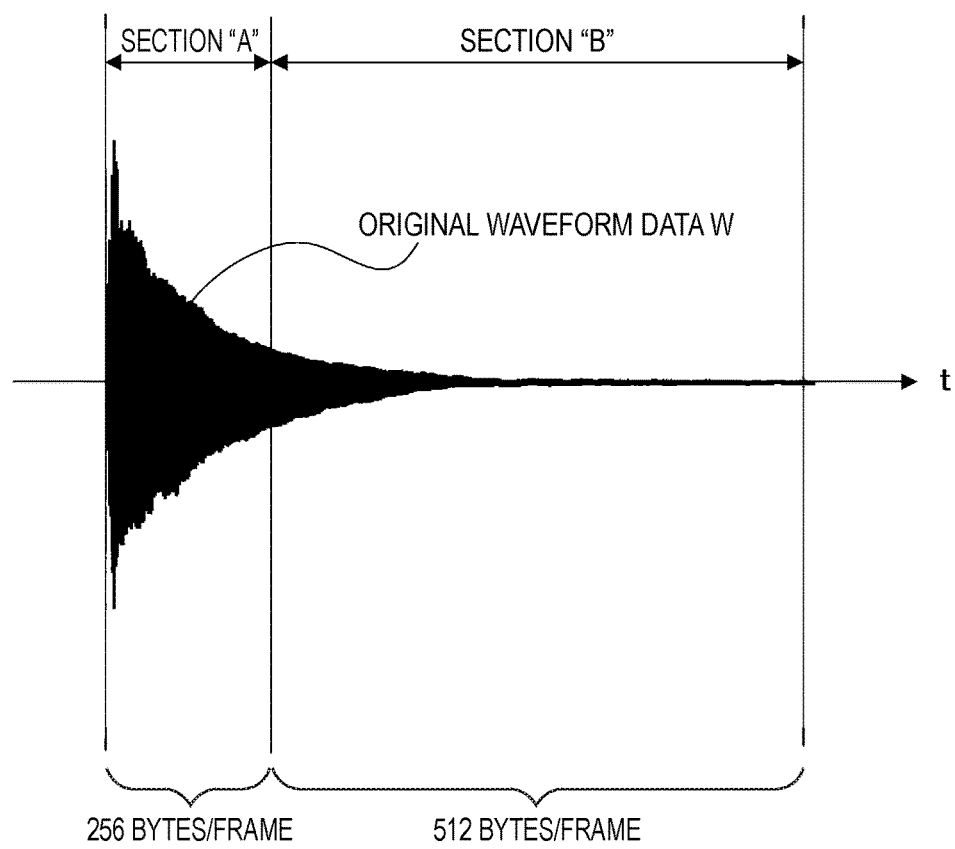
FIG. 7 is a view illustrating an example in which original waveform data W of piano sound is compressed and then is stored in frames.

Now, with reference to FIG. 7, an example in which original waveform data W of piano sound is compressed and is stored in frames will be described. As shown in FIG. 7, the original waveform data W obtained by performing sampling on piano sound is divided into a section "A" in which the waveform attenuates from an initial rise to a predetermined level, and a section "B" next to the section "A". In the section "A" including an attack section which is the intro of the sound, the waveform varies rapidly; whereas, in the section "B" which is a sustentation section, the waveform varies gently.

In the section "A" in which the waveform varies rapidly, since the effective-bit lengths of individual waveform samples (prediction error data items E) vary, the common effective-bit length of the first half of a frame does not coincide with the common effective-bit length of the second half of the frame. For this reason, the above-described determining unit 13 determines 256 bytes as the size of one frame for the section "A". As a result, in the storage unit 16, a header information item is stored in the auxiliary information area of a frame shown in FIG. 6B, and compressed samples obtained by extracting quantized waveform samples (prediction error data items E) based on the data item "COMMON EFFECTIVE-BIT LENGTH" included in the header information item are sequentially stored in the data area. At this time, the number of samples which are stored is determined based on the data item "COMMON EFFECTIVE-BIT LENGTH". For example, in a case where the common effective-bit length is 9 bits, 224 samples are stored in the data area (252 bytes).

Meanwhile, in the section "B" in which the waveform varies gently, since the effective-bit lengths of individual waveform samples (prediction error data items E) do not vary, the common effective-bit length of the first half of a frame coincides with the common effective-bit length of the second half of the frame. For this reason, the above-described determining unit 13 determines 512 bytes as the size of one frame for the section "B".

As a result, in the above-described storage unit 16, a header information item is stored in the auxiliary information area of a frame shown in FIG. 6A, and compressed samples obtained by extracting quantized waveform samples (prediction error data items E) based on the data item "COMMON EFFECTIVE-BIT LENGTH" included in the header information item are sequentially stored in the data area. At this time, the number of samples which are stored is determined based on the data item "COMMON EFFECTIVE-BIT LENGTH". For example, in a case where the common effective-bit length is 10 bits, 406 samples are stored in the data area (508 bytes).

Frames which are formed in the above-described way are output in units of a frame from the storage unit 16, and are stored in a memory 17 (see FIG. 1). The frames stored in the memory 17 are read by the waveform data extracting device 150 shown in FIG. 8.

Figure 8:
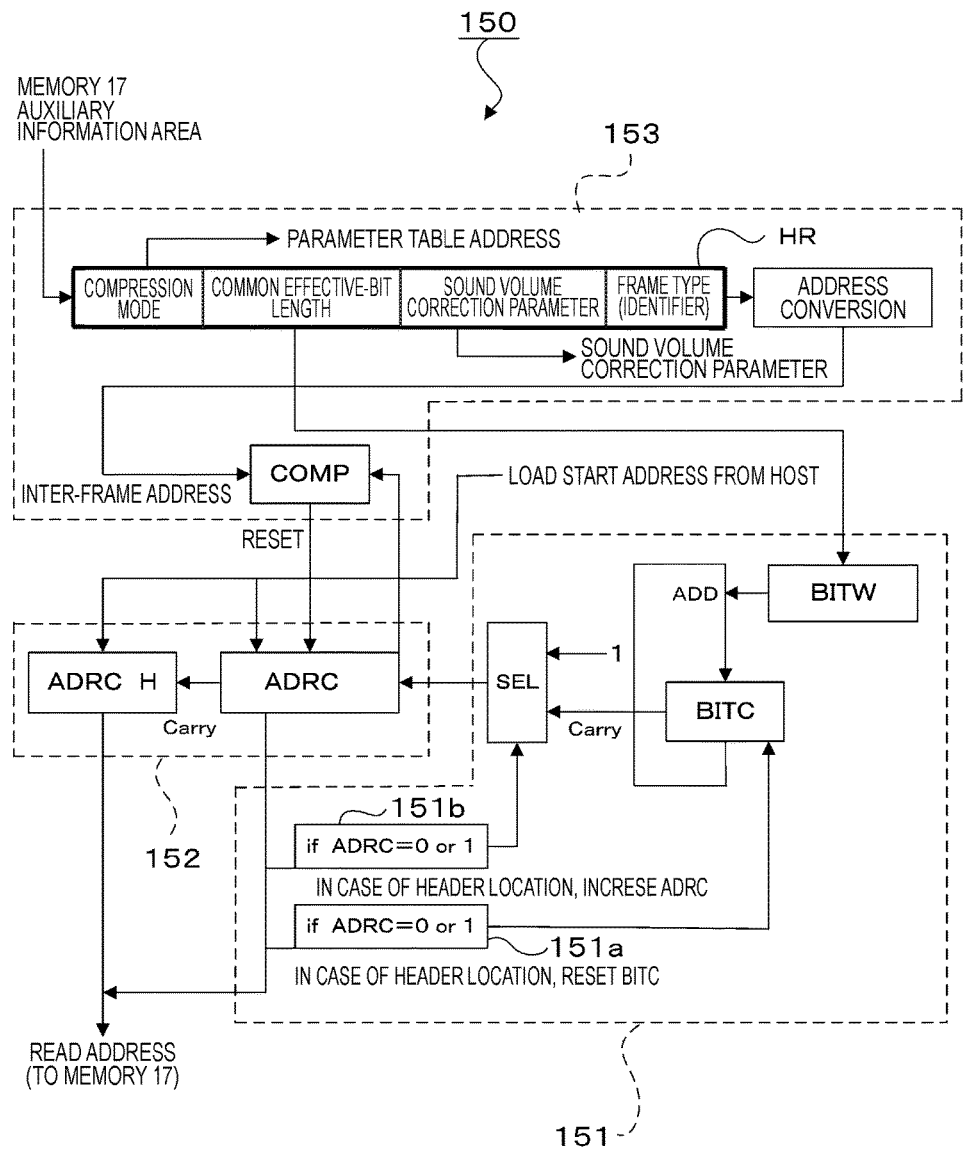
FIG. 8 is a block diagram illustrating the configuration of a waveform data extracting device 150.

Now, with reference to FIG. 8, the configuration of the waveform data extracting device 150 will be described roughly. The waveform data extracting device 150 includes an address data generating unit 151 for generating address data items, using a common effective-bit length read from the auxiliary information area of a designated frame stored in the memory 17, as an increase rate, an extracting unit 152 for extracting compressed samples from the data area of the frame stored in the memory 17 based on the generated address data items, and a frame designating unit 153 for designating the next frame of the designated frame from the memory 17 if the number of compressed samples extracted from the data area stored in the memory 17 exceeds a frame size designated by a frame type (an identifier) stored in the auxiliary information area.

The address data generating unit 151 includes a register BITW, a counter BITC, a determining unit 151$a$, a determining unit 151$b$, and a selector SEL, and the extracting unit 152 includes an address counter ADRC_H and an address counter ADRC, and the frame designating unit 153 includes a header register HR, an address converter, and a comparator COMP.

The waveform data extracting device 150 loads an upper frame address from a host (a CPU) (not shown) into the address counter ADRC_H, and loads an inter-frame address from the host into the address counter ADRC. If "0" for designating the head of a frame is stored as a read start address in the address counter ADRC, the waveform data extracting device reads out a header information item stored in the auxiliary information area of the read object frame, from the memory 17, and stores the read header information item in the header register HR.

A common effective-bit length included in the header information item stored in the header register HR is stored in the register BITW. A frame type (an identifier) included in the header information item stored in the header register HR is converted into an inter-frame address corresponding to the size of one frame, and the inter-frame address is input to one terminal of the comparator COMP. The counter BITC is for designating the bit position of one compressed sample to be stored in the data area of a frame. In a case where the determining unit 151$a$ determines that the address counter ADRC (an inter-frame address) has "0" or "1" representing a header information item, the counter BITC is reset. Meanwhile, in a case where the determining unit 151$b$ also determines that the address counter ADRC has "0" or "1" representing a header information item, the counter BITC supplies "1" to the selector SEL, thereby forcibly increasing the value of the address counter ADRC. In a case where the address counter ADRC has a value other than "0" and "1" (a value which does not represent a header information item), the selector SEL supplies a "Carry" signal of the counter BITC.

The counter BITC sums up the value of the register BITW, whereby the value of the address counter ADRC is increased, whereby a read address for reading a compressed sample stored in the data area of the frame is generated. The read address is output from the address counter ADRC, and is input to the other terminal of the comparator COMP. In a case where the value of the address counter ADRC (an inter-frame address) becomes a value corresponding to the size of one frame, the comparator COMP resets the address counter ADRC.

As described above, the waveform data extracting device 150 generates read addresses of individual compressed samples stored in the data areas of read object frames, with reference to frame types (identifiers) and common effective-bit lengths included in their header information items, and reads the compressed samples from the individual frames based on the generated read addresses.

Figure 9:
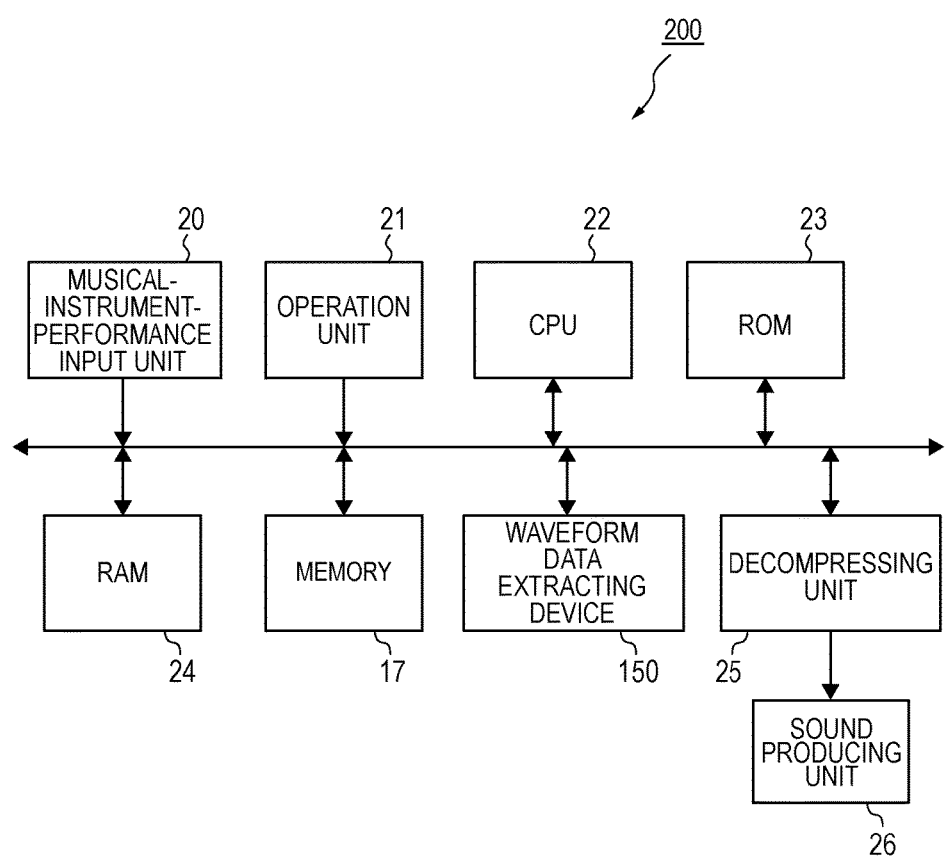
FIG. 9 is a block diagram illustrating the configuration of an electronic musical instrument 200 which includes the waveform data extracting device 150.

Now, with reference to FIG. 9, the electronic musical instrument 200 including the above-described memory 17 and the above-described waveform data extracting device 150 will be described. FIG. 9 is a block diagram illustrating the overall configuration of the electronic musical instrument 200. In FIG. 9, a musical-instrument-performance input unit 20 generates musical-instrument-performance information according to playing operations. An operation unit 21 has various operation switches, and generates switch events according to the types of switches operated by a user. A CPU 22 generates note-on or note-off events according to the musical-instrument-performance information generated by the musical-instrument-performance input unit 20, and supplies the note-on or note-off events to the waveform data extracting device 150, and instructs the waveform data extracting device 150 to read compressed samples (compressed waveform data items) necessary for music generation, from the memory 17.

A ROM 23 stores various control programs to be loaded into the CPU 22. A RAM 24 temporarily stores a variety of register/flag data to be used in processing of the CPU 22. The memory 17 retains compressed samples (compressed waveform data items) having certain tones, in advance, and in response to a read instruction of a CPU 22, the waveform data extracting device 150 reads compressed samples necessary for music generation, from the memory 17.

A decompressing unit 25 performs a decompressing process on the compressed samples read by the waveform data extracting device 150, thereby obtaining waveform data, and supplies the waveform data to a sound producing unit 26. The sound producing unit 26 generates music data based on the waveform data supplied from the decompressing unit 25, and converts the generated music data into an analog music signal, and performs filtering for filtering out unnecessary components such as noise from the music signal, and amplifies the level of the music signal, and outputs sound from a speaker.

As described above, according to the present embodiment, in a section where a waveform varies rapidly, since the effective-bit lengths of individual waveform samples (prediction error data items E) vary, and thus the common effective-bit length of the first half of a frame does not coincide with the common effective-bit length of the second half of the frame, the size of one frame is set to 256 bytes. Meanwhile, in a section where a waveform varies gently, since the effective-bit lengths of individual waveform samples (prediction error data items E) do not vary, and thus the common effective-bit length of the first half of a frame coincides with the common effective-bit length of the second half of the frame, the size of one frame is set to 512 bytes. In this way, it is possible to set different frame sizes depending on tones (waveform types).

Also, since different frame sizes are set in the above-described way, as compared to a case of using a fixed frame size, it is possible to solve the problem that, as the number of frames increases, an amount of wasteful redundant header information increases or the number of code bits in waveform samples increases.

Besides, according to the above-described embodiment, since a "sound volume correction parameter" is stored as a header information item in the auxiliary information area of a frame, for example, with respect to an attack section of the first half of the waveform samples, sound volume data having the same sound volume as that of its original sound is stored, and with respect to the second half of the waveform samples, sound volume data having a sound volume lower than that of its original sound is stored. In this way, it is possible to store the attack section of the first half of the waveform samples with high quality based on a low compression ratio, and it is possible to store the second half of the waveform samples with low quality based on a high compression ratio.

Also, in a case where the waveform data extracting device 150 extracts compressed waveform data from the memory, it is possible to restore the sound volume of the waveform data to the sound volume of the original sound, using the sound volume correction parameter.

Also, according to the present embodiment, if the common effective-bit length of the first half of a frame does not coincide with the common effective-bit length of the second half of the frame, the size of one frame is set to 256 bytes (a frame) including 4 bytes for an auxiliary information area and 252 bytes for a data area; whereas if the common effective-bit length of the first half of a frame coincides with the common effective-bit length of the second half of the frame, the size of one frame is set to 512 bytes (a frame) including 4 bytes for an auxiliary information area and 508 bytes for a data area. However, the present invention is not limited thereto, and it is also possible that, in a case where a predetermined number or more of consecutive samples have the same bit length equal to a quantization bit length determined by the quantization-bit-length determining unit 13a, the size determining unit 13b determines 512 bytes (a frame) as the size of one frame; whereas in a case where the predetermined number or more of consecutive samples do not have the same bit length equal to the quantization bit length determined by the quantization-bit-length determining unit 13a, the size determining unit 13b determines 256 bytes (a frame) as the size of one frame.

In other words, it is also possible to use an easy method in which, in a section in which a waveform varies rapidly, since the predetermined number or more of consecutive samples do not have the same bit length equal to a quantization bit length determined by the quantization-bit-length determining unit 13a, the size determining unit 13b determines 256 bytes (a frame) as the size of one frame, and in a section in which the waveform varies gently, since the predetermined number or more of consecutive samples have the same bit length equal to the quantization bit length determined by the quantization-bit-length determining unit 13a, the size determining unit 13b determines 512 bytes (a frame) as the size of one frame.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A waveform data storage device comprising:
a determining unit that determines one of at least first and second frames based on a result of whether or not a first value is equal to a second value, the first value being a value of a common effective-bit length calculated based on compressed waveform samples corresponding to the first frame, and the second value being a value of the common effective-bit length calculated based on the compressed waveform samples corresponding to the second frame, wherein a set number of compressed waveform samples to be stored in the first frame is different from a set number of compressed waveform samples to be stored in the second frame;
an auxiliary information storage unit that stores frame attribute data including one of the first value and the second value and an identifier for identifying one of the first and second frames, in an auxiliary information area of the first or second frame determined by the determining unit; and
a waveform sample storage unit that stores the compressed waveform samples in a data area of the first or second frame determined by the determining unit, based on the set number of compressed waveform samples according to the one of the first value and the second value of the common effective-bit length of the frame attribute data stored in the auxiliary information area.

2. The waveform data storage device according to claim 1, wherein:
in a case where the first value is not equal to the second value, the determining unit determines a small-size frame of the first and second frames; and
in a case where the first value is equal to the second value, the determining unit determines a large-size frame of the first and second frames.

3. The waveform data storage device according to claim 1, wherein:
the determining unit virtually defines a first half of a frame and a second half of the frame, in advance; and
the determining unit includes:
a first-half frame forming unit that extracts the maximum effective-bit length of the effective-bit lengths of individual compressed waveform samples to be stored, as a first common effective-bit length, and that forms the first half of the frame when a number of extracted compressed waveform samples reaches a storable number of compressed waveform samples in the first half of a frame, wherein the storable number of compressed waveform samples is determined based on the extracted first common effective-bit length;
a second-half frame forming unit that extracts the maximum effective-bit length of the effective-bit lengths of subsequent compressed waveform samples to be stored which are supplied after the compressed waveform samples of the first-half frame forming unit, as a second common effective-bit length, and that forms the second half of the frame when a number of extracted compressed waveform samples reaches a storable number of compressed waveform samples in the second half of the frame, wherein the storable number of compressed waveform samples is determined based on the extracted second common effective-bit length;
a first frame attribute data generating unit that generates frame attribute data including a frame type representing a large-size frame of the first and second frames and the second common effective-bit length extracted by the second-half frame forming unit, in a case where the first common effective-bit length extracted by the first-half frame forming unit coincides with the second common effective-bit length extracted by the second-half frame forming unit; and a second frame attribute data generating unit that generates frame attribute data including a frame type representing a small-size frame of the first and second frames and the first common effective-bit length extracted by the first-half frame forming unit, in a case where the first common effective-bit length extracted by the first-half frame forming unit does not coincide with the second common effective-bit length extracted by the second-half frame forming unit.

4. The waveform data storage device according to claim 1, wherein:

the waveform sample storage unit stores the compressed waveform samples, which are obtained by coding individual waveform samples, based on the one of the first value and the second value of the common effective-bit length of the frame attribute data stored in the auxiliary information area, in the data area of the first or second frame determined by the determining unit.

5. A waveform data storage device comprising:

a determining unit that determines one frame from a plurality of frames based on a bit length of compressed waveform samples which are supplied, wherein frame sizes of the plurality of frames for storing compressed waveform samples are different from each other; and a storage unit that stores at least bit length data representing the bit length of the compressed waveform samples and frame attribute data representing the one frame determined by the determining unit, in an auxiliary information area set in a memory, that sets a data area having a size based on the frame attribute data stored in the auxiliary information area in the memory, and that stores the compressed waveform samples in the data area set in the memory.

6. A waveform data extracting device comprising:

a memory having a waveform data structure, the waveform data structure being configured by one of at least first and second frames, each of the first and second frames being determined based on a result of whether or not a first value is equal to a second value, the first value being a value of a common effective-bit length calculated based on compressed waveform samples corresponding to the first frame, the second value being a value of the common effective-bit length calculated based on the compressed waveform samples corresponding to the second frame, a set number of compressed waveform samples to be stored in the first frame being different from a set number of compressed waveform samples to be stored in the second frame, each of the first and second frames including an auxiliary information area and a data area, the auxiliary information area including an area for storing one of the first value and the second value and an area for storing an identifier for identifying one of the first and second frames, the data area being an area for storing extracted waveform samples which are extracted from the compressed waveform samples in accordance with the one of the first value and the second value, and a number of the extracted waveform samples being determined based on the one of the first value and the second value and the one of the first and second frames which is identified by the identifier;

an address data generating unit that generates address data based on the one of the first value and the second value read from the auxiliary information area of a designated frame stored in the memory;

an extracting unit that extracts the stored extracted waveform samples from the data area of the designated frame, according to the address data generated by the address data generating unit; and a frame designating unit that designates the next frame to be extracted after the stored extracted waveform samples are extracted by the extracting unit.

7. A waveform data extracting device comprising:

a memory having a waveform data structure, the waveform data structure being configured by at least first and second frames, a set number of compressed waveform samples to be stored in the first frame being different from a set number of compressed waveform samples to be stored in the second frame, each of the first and second frames including an auxiliary information area and a data area, the auxiliary information area having frame attribute data including an area for storing common effective-bit length data indicating a value of a common effective-bit length for compressed waveform samples and an area for storing an identifier for identifying one of the first and second frames, and the data area being an area for storing as many compressed waveform samples as the set number of compressed waveform samples determined according to the one of the first and second frames which is identified by the identifier and the value of the common effective-bit length;

a reading unit that sequentially reads the compressed waveform samples from the data area of a designated frame, according to address data based on the value of the common effective-bit length of the frame attribute data stored in the auxiliary information area of the designated frame; and a next-frame designating unit that designates one of the first and second frames as the next frame to be read after the compressed waveform samples of the designated frame are read by the reading unit.

8. An electronic musical instrument comprising:

the waveform data extracting device according to claim 6;

a musical-instrument-performance input unit that generates musical-instrument-performance information according to playing operations;

a processing unit that performs an instructing process of instructing music generation according to the playing operations, and a control process of controlling the waveform data extracting device such that the waveform data extracting device extracts necessary waveform samples from the memory in response to the instructing process, and a sound producing unit that produces music sound based on waveform data obtained by decompressing the waveform samples taken from the waveform data extracting device.

9. An electronic musical instrument comprising:

the waveform data extracting device according to claim 7;

a musical-instrument-performance input unit that generates musical-instrument-performance information according to playing operations;

a processing unit that performs an instructing process of instructing music generation according to the playing operations, and a control process of controlling the waveform data extracting device such that the waveform data extracting device extracts necessary waveform samples from the memory in response to the instructing process; and a sound producing unit that produces music sound based on waveform data obtained by decompressing the waveform samples taken from the waveform data extracting device.

10. The electronic musical instrument according to claim 8, wherein: the sound producing unit produces sound based on waveform samples restored according to a sound volume correction parameter when the waveform data extracting device extracts the sound volume correction parameter from the auxiliary information area of a frame.

11. A waveform data storage device comprising:
a determining unit that determines one of at least first and second frames based on a variation in effective-bit lengths of individual compressed waveform samples to be stored, wherein a set number of compressed waveform samples to be stored in the first frame is different from a set number of compressed waveform samples to be stored in the second frame;
an auxiliary information storage unit that stores frame attribute data including a value of a common effective-bit length of the compressed waveform samples and a frame type for identifying one of the first and second frames, in an auxiliary information area of the first or second frame determined by the determining unit; and
a waveform sample storage unit that stores the compressed waveform samples in a data area of the first or second frame determined by the determining unit, based on the set number of compressed waveform samples according to the value of the common effective-bit length of the frame attribute data stored in the auxiliary information area,
wherein:
the determining unit virtually defines a first half of a frame and a second half of the frame, in advance; and
the determining unit includes:
a first-half frame forming unit that extracts the maximum effective-bit length of the effective-bit lengths of individual compressed waveform samples to be stored, as a first common effective-bit length, and that forms the first half of the frame when a number of extracted compressed waveform samples reaches a storable number of compressed waveform samples in the first half of a frame, wherein the storable number of compressed waveform samples is determined based on the extracted first common effective-bit length;
a second-half frame forming unit that extracts the maximum effective-bit length of the effective-bit lengths of subsequent compressed waveform samples to be stored which are supplied after the compressed waveform samples of the first-half frame forming unit, as a second common effective-bit length, and that forms the second half of the frame when a number of extracted compressed waveform samples reaches a storable number of compressed waveform samples in the second half of the frame, wherein the storable number of compressed waveform samples is determined based on the extracted second common effective-bit length;
a first frame attribute data generating unit that generates frame attribute data including a frame type representing a large-size frame of the first and second frames and the second common effective-bit length extracted by the second-half frame forming unit, in a case where the first common effective-bit length extracted by the first-half frame forming unit coincides with the second common effective-bit length extracted by the second-half frame forming unit; and
a second frame attribute data generating unit that generates frame attribute data including a frame type representing a small-size frame of the first and second frames and the first common effective-bit length extracted by the first-half frame forming unit, in a case where the first common effective-bit length extracted by the first-half frame forming unit does not coincide with the second common effective-bit length extracted by the second-half frame forming unit.

12. A waveform data storage device comprising:
a determining unit that determines one frame from a plurality of frames based on a bit length of compressed waveform samples which are supplied, wherein frame sizes of the plurality of frames for storing compressed waveform samples are different from each other; and
a storage unit that stores at least bit length data representing the bit length of the compressed waveform samples and frame attribute data representing the one frame determined by the determining unit, in an auxiliary information area set in a memory, that sets a data area having a size based on the frame attribute data stored in the auxiliary information area in the memory, and that stores the compressed waveform samples in the data area set in the memory,
wherein the determining unit includes:
a consecutiveness determining unit that determines whether a predetermined number or more of consecutive compressed waveform samples have the same bit length equal to a quantization bit length of prediction error data obtained by adaptive prediction of waveform samples of an original waveform; and
a size determining unit that determines a small data area size among different data area sizes, in a case where the consecutiveness determining unit determines that the predetermined number or more of consecutive compressed waveform samples do not have the same bit length, and that determines a large data area size in a case where the consecutiveness determining unit determines that the predetermined number or more of consecutive compressed waveform samples have the same bit length.

* * * * *